…

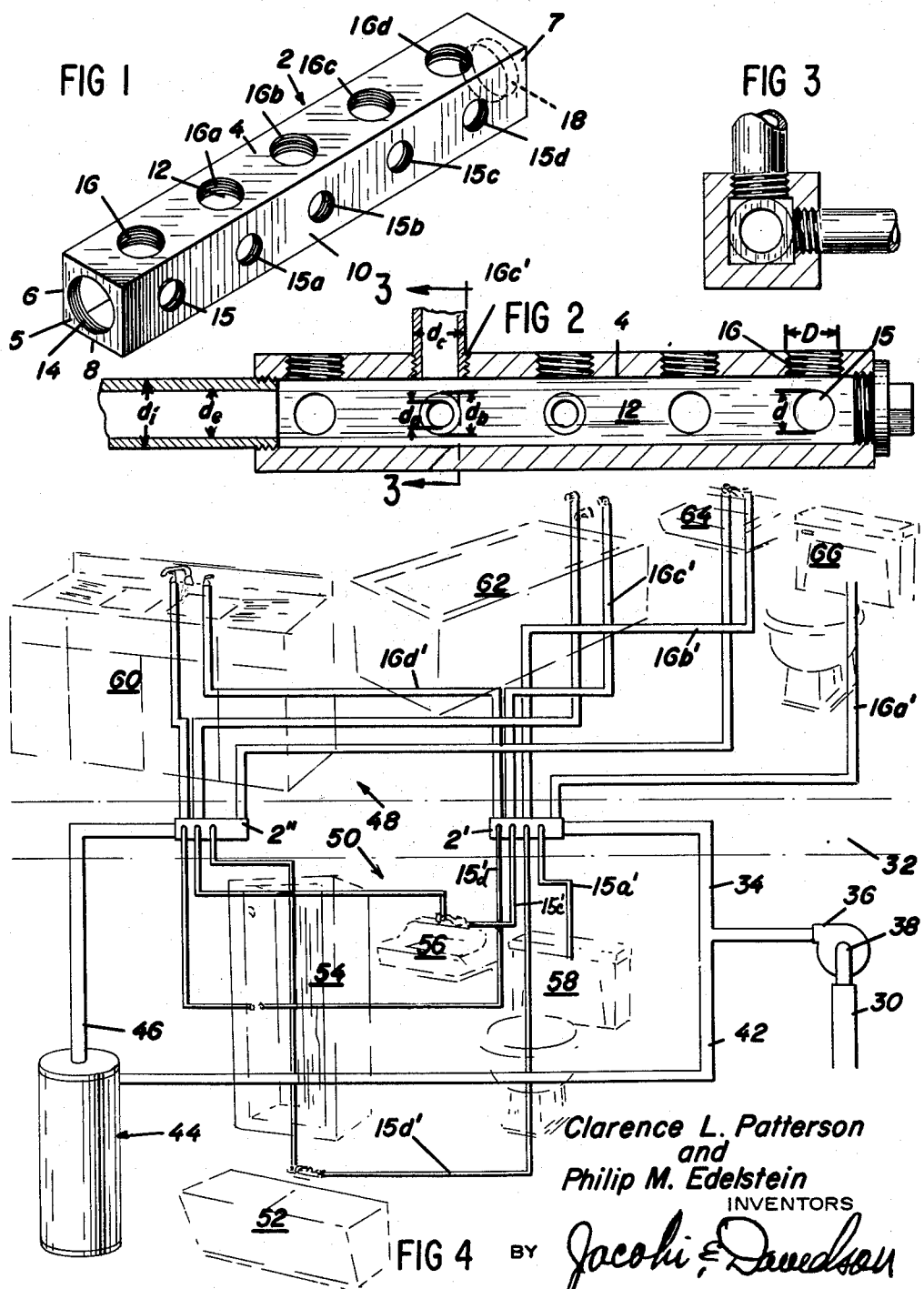

United States Patent Office

3,175,578
Patented Mar. 30, 1965

3,175,578
WATER SUPPLY SYSTEMS
Clarence L. Patterson, Glen Allen, Va., and Philip M. Edelstein, 4317 Russell Ave., Mount Rainier, Md.
Filed June 5, 1963, Ser. No. 285,804
4 Claims. (Cl. 137—561)

This application is a continuation-in-part of our prior application Serial No. 205,801, filed June 27, 1962, entitled Home Water Systems, and now abandoned.

This invention relates generally to water supply systems, and is particularly concerned with improvements in water supply systems such as are commonly found in homes having water outlets on different levels.

In water supply systems which are in common use today, water is fed to a dwelling, or other building, through an incoming supply conduit linked with a pressurized water supply. Within any given building, and particularly with respect to water which is not heated, there is a continuous line from the supply conduit to various outlets within the building. For example, the cold water from the incoming supply conduit may be led first to an outlet at a sink on the ground level of the building, and then through a common coupling adjacent such outlet, and another conduit, to an outlet on an upper level of the building. Thus, incoming cold water, according to this example, would initially pass the first outlet on the ground level, and then travel through a continuation of the conduit leading thereto before reaching the second outlet on an upper level.

With hot water, the arrangement is generally the same, although the incoming water is initially fed to a water heater. From the water heater, the water passes through a conduit to a first outlet, for example, on the ground level, and then from a coupling adjacent such outlet, through an extension conduit to an outlet on the second level. The hot water traveling to the outlet on the second level must pass the outlet at the first level rather than travel directly from the water heater. Although only one hot and cold water outlet on each level has been described in this example, it will be appreciated that the arrangement is generally the same for multiple outlets of each type on each level.

In cities, where the pressure of the water fed to the particular building or dwelling can be maintained because of the availability of large reservoirs and the like, there may be no serious difficulty or decreasing delivery of water through a given outlet experienced when another outlet at a lower level is operated. On the other hand, even in certain areas within metropolitan districts, the pressure of the water supply to the building is affected seriously by the number of outlets which are opened at the same time. However, the effect of opening a plurality of outlets simultaneously is possibly most serious in rural areas where a given building or series of outlets are supplied from a common pump connected, for example, with a well. Here, there is no sufficient water storage or accumulation system, such as a metropolitan reservoir, and the pressure or water delivery at each outlet varies severly with the water being delivered through other outlets.

The variation in water delivery is commonly experienced by the average individual at a sink having a hot and cold water mixing outlet, or in a shower. For example, in rural areas particularly, when one is using a shower on the upper level, and someone else uses the cold water on a lower level, then the water leaving the shower becomes excessively hot due to the lack of cold water available at the upper level to mix with the hot water so as to maintain the mixed water temperature relatively constant.

The present invention is directed to a simple expedient which will overcome the problems experienced in areas where water supply at different levels is affected by use of outlets at different levels. More particularly, the present invention has as its primary object the provision of a system which eliminates the aforesaid problems and inconveniences, and which permits, even in rural areas, a comparatively even distribution of water to outlets at upper levels even when outlets on lower levels are opened.

Still further, it is an object of the present invention to provide what may be deemed an accessory or attachment for the input of a water supply system, which accessory or attachment allows the user to easily achieve the advantages of the system constructed in accordance herewith.

In its more basic aspects, the invention utilizes two well-known physical principles. The first principle is that there is an equal pressure distribution within a closed reservoir—i.e., if pressure is applied at any point to a fluid in a closed container, such pressure is transmitted without change to every point within the container. The second principle relates to the quantity of fluid supplied through a particular conduit. Specifically, the second principle involved is that the quantity of fluid fed through a given conduit varies directly with the cross-sectional area of the conduit.

In accordance with the invention, a water system is provided wherein all outlets within a given building and for a given type water are coupled directly with a common reservoir which in turn is connected with the pressurized water supply. If hot and cold water are used within the particular building, then a common reservoir is used for all connections with the hot water outlets, and a different common reservoir is used for all connections with the cold water outlets. The common reservoir, in each instance, is effectively a close approximation to a closed container so that there is an even pressure distribution to all of the conduits. With the provision of a common reservoir in a water system as prescribed herein, incoming water does not pass by one outlet to reach another outlet. Instead, incoming water is fed to the reservoir, and then directly from the reservoir to each outlet. This arrangement, in and of itself, affords certain advantages since it permits relatively even pressure distribution to the various outlets coupled with a common reservoir. However, for the ultimate results of the invention, and to compensate for the difference in levels within a building, the invention provides for utilizing (a) conduits having a larger cross-sectional area for coupling the outlets on an upper level with the reservoir, and (b) conduits having a relatively smaller cross-sectional area for coupling the outlets on the lower level with the common reservoir.

With the provision of the common reservoir, and with the use of conduits having different cross-sectional areas leading from the reservoir to outlets on different levels, one can readily achieve a water system wherein the use of an outlet on the lower level does not adversely affect the use of an outlet on an upper level, even in areas where large reservoirs and the like are not available. The reservoir can be deemed to be a manifold, but the cross-sectional area thereof longitudinally and laterally should exceed the cross-sectional area of any outlet conduits used therewith so that there is truly a reservoir rather than a mere coupling device.

The invention lies in an overall system, as well as in a reservoir housing. However, further objects of the invention, and the details of the particular systems and components provided hereby, will be better understood when reference is made to the following detailed description. Such description is related to the annexed drawings wherein:

FIGURE 1 is a perspective view of a reservoir housing constructed in accordance with the invention, and particularly adapted for use in the water system thereof;

FIGURE 2 is a longitudinal cross-sectional view of the reservoir housing shown in FIGURE 1, and additionally showing an end closing plug;

FIGURE 3 is a transverse cross-sectional view taken on the line 3—3 of FIGURE 2; and, FIGURE 4 is a schematic illustration showing how the system of the invention can be installed as a complete water system in a dwelling.

Referring now more particularly to the drawings, there is shown in FIGURE 1 a reservoir housing for use in a water supply system constructed in accordance herewith. The housing is generally designated by the numeral 2, and comprises a plurality of side walls 4, 6, 8 and 10, and a pair of end walls 5 and 7. The side walls define an unobstructed reservoir 12 within the housing which is closed by end walls 5 and 7. An inlet 14 is provided in the end wall 5 of the housing, such inlet taking the form of a threaded aperture. Similarly, a first set of threaded coupling apertures 15, 15a, 15b, 15c and 15d are incorporated in side wall 4 of the housing 2, and a second set of threaded coupling apertures 16, 16a, 16b, 16c and 16d are incorporated in side wall 10 of the housing. Although in the embodiment shown, the first set of apertures is incorporated in the side wall 10, and the second set of apertures is provided in the side wall 4, other side walls can have the apertures therein.

In fact, if the reservoir housing 2 is used in a three-level building, for example, then further apertures can be placed in another side wall, e.g., side wall 6 or side wall 8.

As explained more fully below, the apertures in side wall 4 are of different size from the apertures in side wall 10. Thus, the respective apertures have been grouped into first and second sets.

Notwithstanding the grouping, apertures of differing size can be placed in one side wall of the housing, or in various side walls of the housing 2. Still, the invention contemplates as a preferred embodiment, the use of differing size sets of apertures in different side walls because this facilitates the coupling of proper size conduits leading to respectively different levels. This particular advantage will be more fully understood after reviewing the description of the overall system set forth below.

Before referring to such description, however, it is important to understand the dimensional relationship of the various threaded or coupling apertures.

The housing 2, as shown in FIGURE 1, has an additional threaded end aperture 18 which is disposed in end wall 7 opposite the inlet coupling 14. The threaded aperture 18 can be used as the inlet in place of the threaded aperture 14, thus facilitating use and positioning of the reservoir housing 2. However, one of the end coupling apertures 14 or 18 would be plugged in operation of the apparatus so that the housing 2 forms a closed reservoir except for the inlet and the coupling apertures.

Now, if reference is made to FIGURE 2, it will be noted that each of the apertures 15–15d has a diameter $d$ which is smaller than the diameter $D$ of each of the apertures 16–16d. Furthermore, both the apertures 15–15d and the apertures 16–16d have diameters which are smaller than the diameter of either of the inlet apertures 14 or 18, the latter diameter being designated as $di$.

From the above description, it should be apparent that the inlet to the reservoir has a first cross-sectional area, that the first group of coupling apertures 15–15d in the side wall 4 of the housing 2 have a second cross-sectional area less than the first cross-sectional area, and that the second group of coupling apertures 16–16d in the side wall 10 of the housing 2 have a third cross-sectional area less than the first cross-sectional area but greater than the second cross-sectional area.

The above-described housing constitutes an important aspect of the present invention since it permits the construction of a water supply system which achieves the aforesaid advantages. The water supply system, however, also constitutes an important aspect of the invention.

To understand the overall water supply system of the invention, reference is now made to FIGURE 4. In this figure, water is shown as being fed from a well 30 to a building 32 through an inlet supply conduit 34. The inlet supply conduit 34 extends from a pump 36 which is suitably connected by conventional means with the conduit 38 leading into the well. The water is pumped from well 30 through conduit 38 and then through the conduit 34, the water under the pump pressure enters the housing 2 which corresponds identically with the housing 2 of FIGURE 1. In this particular instance, a coupling conduit 42 is shown as leading from the pump 36 to the hot water heater 44 within the building. Then from the hot water heater, a coupling conduit 46 leads to another housing 2' which again corresponds identically with the housing 2 shown in FIGURE 1.

While two inlet supply conduits 34 and 42 have been shown for the hot and cold water supply, respectively, and while in most any building a hot and cold water supply is provided, for purposes of understanding the instant invention, it is only necessary to fully discuss either the hot water supply arrangement or the cold water supply arrangement. With an understanding of one of these arrangements, it will be apparent that the other arrangement is virtually identical insofar as the supply from the reservoir housing 2 or 2' is concerned.

To orient the reader with respect to either system, it is desirable initially to consider the various types of outlets which may be within a building with which the system is used, as well as exemplary location thereof. For this purpose, reference is now made to the exemplary fixtures shown in the building 32 schematically illustrated in FIGURE 4.

The building 32 has an upper level generally designated by the numeral 48, and a lower level generally designated by the numeral 50. Disposed on the lower level 50 are a laundry tub 52, a shower 54, a sink 56, and a commode 58. Disposed on the upper level 48 are a kitchen sink 60, a bathtub 62, a sink 64, and a commode 66.

These described fixtures can be of any conventional type. The showers and sinks, however, preferably have a conventional water mixing assembly providing an outlet from a single spout. It is with such type of conventional fixture, that the invention finds particular utility, although the system hereof will operate with advantage even in water systems where there is merely a cold water supply, as for example, where drinking fountains are disposed on different levels.

Of course, it is to be understood, as indicated above, that the particular schematic illustration of FIGURE 4 is exemplary of one building, and that the particular fixtures and outlets may vary from building to building. In any instance, the overall operation of the system of the invention is generally the same, and thus, by illustrating the operation in a single building, the adaptation of the invention to other building water supply systems will become obvious.

For purposes of explaining the coupling arrangement of conduits with the reservoir and with the outlets according to the instant invention, reference is now made jointly to FIGURES 2 and 4.

Leading from the coupling apertures 15, 15a, 15b, 15c, and 15d of reservoir housing 2 are the conduits 15', 15b' 15c' and 15d'. These conduits have a cross-sectional area corresponding to the cross-sectional area of the threaded apertures 15, 15a, 15b, 15c and 15d—i.e., an inner diameter $da$ of a magnitude specifically related to the outer diameter $db$ which cooperates with the first set of threaded apertures. The outer periphery of conduits 15'–15d' is, of course, threaded.

Now, leading from the coupling apertures 16, 16a, 16b, 16c and 16d of housing 2 are the coupling conduits 16" 16a', 16b', 16c' and 16d'. These conduits have a cross-sectional area corresponding to the cross-sectional area of the coupling apertures 16 through 16d inclusive—i.e., the inner diameter dc of these conduits is larger than the inner diameter da of the conduits coupled with the coupling apertures 15–15d, but less than the inner diameter de of the input conduit 34 which, in this instance, is coupled with the inlet coupling 14.

With this system, as described, all of the incoming cold water is initially fed to the housing 2 or 2'. The water entering through the conduit 34, and passing into the housing 2, reaches what is effectively a closed container or reservoir, namely, the reservoir 12, formed by the unobstructed space in housing 2. If none of the outlets coupled with the conduits leading from this reservoir are opened, the pressure is distributed throughout the reservoir constantly at any point. Now, assume, for example, that the cold water is turned on at the sink 60. In this instance, water would be fed through the conduit 16d' from the housing 2. There would be a drain on the reservoir within the housing 2, but there would be an even pressure distribution at all points. Now, assume further, that following the drain of water at the sink 60 through the conduit 16d', another individual opens the cold water outlet at the sink 56 on the lower level 50. In this instance, water will also be fed through the conduit 15a'. However, due to the distribution of water to the reservoir initially, and due to the difference in the size of the conduits 15' and 16d', the opening of the cold water outlet at the sink 56 will not substantially adversely affect the supply of water through the conduit 16d' to the cold water outlet at the sink 60. Instead, with the system hereof, it has been found that due to the incoming feed of water to the common reservoir, and the difference in relative size of the conduits, the opening of an outlet on the lower level does not seriously adversely affect the opening of an outlet on the upper level at the same time. In other words, two outlets on different levels can be opened at the same time without seriously affecting the volume flowing from each.

The above-described operation would be generally the same regardless of the number of outlets used on the different levels 48 and 50 of the building. The sinks 60 and 56 have really been used for convenience of explanation. Repetition of the same operation with different outlets seems unnecessary.

To more closely link the invention with actual practice, it is significant to here note that in a normal dwelling, where the housing 2 is disposed at or near the base of the lower level, suitable difference in size of the conduits and apertures has been found to exist when the conduits leading to the upper level are so-called "three-quarter inch pipe," and when the conduits on the lower level are so-called "one-half inch pipe." These dimensions are not necessarily critical, and there may be a variation from building to building depending on the number of outlets at the various levels. Still, the dimensions illustrate the complete feasibility of using the invention with relatively small pipe in normal dwellings.

To briefly complete the explanation of the overall system, reference is now made to the hot water system illustrated in FIGURE 4. The hot water system for the building 32 is virtually identical with the cold water system. The difference resides in the fact that the water is initially fed to the hot water heater 44, and then from the hot water heater to the housing 2'. From such housing, the hot water is fed through larger conduits to the upper level 48, and through relatively smaller conduits to the lower level 50. Otherwise, the operation is also identical with the operation of the cold water system described above.

Possibly a more vivid example of the importance of the invention can be obtained if one assumes that hot water is being supplied to the sink 64 on the upper level through the hot water outlet. Further assume that cold water is being fed to such sink, and that the sink is of the type wherein there is a mixing of the hot and cold water prior to the dispensing thereof through an outlet nozzle. With the use of merely the hot and cold outlets at the sink 64, the water supply can be controlled so that a proper temperature is maintained. Thereafter, the maintenance of this temperature is not damaged with the use of an outlet on the lower level. More particularly, if, following the adjustment of the hot and cold water outlets at the sink 64, another individual within the building opens the cold water outlet at the laundry tub 52, for example, then the temperature at the sink 64 will remain substantially constant because there will be no serious adverse affect on the water supply thereto. The relative dimensions of the conduits and the provision of the unobstructed reservoir common to all of the conduits for the particular type of water, hot or cold, eliminates the normal interference which would otherwise occur with water systems of the type in conventional use today.

While the invention has been particularly described with reference to a water system, it should be here understood that the invention can be applied to other types of fluid distribution systems without departing from the scope and spirit of the invention.

The housing 2 has been shown in FIGURE 1 as being of generally boxlike configuration because this particular arrangement has been found to be most convenient to manufacture, and most efficient in use. If, however, it is desired to utilize another shape manifold, reservoir, housing, or other common reservoir means, the same can be employed within the invention. The important point in this respect is that a hollow housing be provided which has spaced walls defining an unobstructed reservoir within the housing.

Naturally, as explained above, it is also important that the housing have an inlet coupling, and that the housing have outlet couplings of different sizes to accommodate differing size conduits leading to different levels.

Another feature of importance, which has not been emphasized above, concerns the coupling of the conduits with the coupling apertures. If reference is made to FIGURES 2 and 3, it will be noted that the conduit 16c' has an inner end which terminates flush with the inner surface of the wall 4 of the reservoir housing 2. This flush relation between the inner ends of the conduits and the interior of the reservoir housing is important according to the preferred embodiment hereof, because it renders the reservoir unobstructed whereby the same can function properly as an effective closed container. More generally, the important factor in this regard is that the conduits communicate with the reservoir at the walls of the housing, rather than projecting interiorly thereof. If there is some slight offset, there is no substantial interference with operation, but the conduits should not extend any substantial distance iwthin the reservoir housing 2 for best results. These considerations are equally applicable to the reservoir housing 2' and its associated conduits.

The particular materials from which the reservoir housings are fabricated, and/or from which the conduits are fabricated, may vary depending on the particular installation. Various metals and plastics are suitable for use in forming both the conduits and the housings, as will be apparent to those familiar with the art.

Before concluding, it should be noted that the use of a boxlike housing 2 having pairs of opposed side walls and a pair of opposed end walls permits the selective location of different size apertures, and moreover, affords an adequate reservoir with minimum size. Still further, with inlets at opposite ends of the reservoir, the same can be coupled in series or parallel where more outlet apertures are required in a particular installation.

Of course, it will be appreciated that the pump shown in FIGURE 4 is illustrative of the usual pump and tank assembly which is employed in the feed system of the type schematically presented.

After reading the foregoing detailed description of illustrative and preferred embodiments of the invention, it should be apparent that the objects set forth at the outset of the present specification have been successfully achieved. Accordingly, what is claimed is:

1. A water supply system delivering water to a first set of outlets disposed on one level and a second set of outlets disposed on a different and higher level, the improvement comprising:
   (a) a hollow housing having spaced walls defining an unobstructed reservoir within said housing;
   (b) an inlet in said housing and coupling said reservoir to a pressurized water supply;
   (c) a plurality of first conduits of a first-cross sectional area communicating said reservoir with respective different outlets in said first set;
   (d) a plurality of second conduits of a second and larger cross-sectional area communicating said reservoir with respective different outlets in said second set;
   (e) all said conduits communicating with said reservoir at the walls of said housing.

2. The improved defined in claim 1 wherein said hollow housing comprises a boxlike structure, wherein said first conduits communicate with said reservoir through one wall of said boxlike structure, wherein said second conduits communicate with said reservoir through another wall of said boxlike structure, and wherein said inlet is disposed in a wall of said boxlike structure extending transversely to the walls of said boxlike structure through which said first conduits and said second conduits communicate with said reservoir.

3. The improvement defined in claim 1 wherein said hollow housing comprises a tubular casing, and wherein said reservoir has a parallelogram shape in any longitudinal or transverse cross-section thereof.

4. The improvement defined in claim 1 wherein said inlet comprises a threaded aperture in an end wall of said housing, and wherein said first conduits and said second conduits communicate with said reservoir through side walls of said housing.

References Cited by the Examiner

UNITED STATES PATENTS

| | | | |
|---|---|---|---|
| 2,144,898 | 1/39 | Shrode | 137—561.1 X |
| 2,652,069 | 9/53 | Goheen | 137—561.1 X |
| 2,723,680 | 11/55 | Danel | 137—561.1 |

M. CARY NELSON, *Primary Examiner.*